(12) United States Patent
Loladze et al.

(10) Patent No.: US 8,905,678 B2
(45) Date of Patent: Dec. 9, 2014

(54) METHOD FOR TRANSPORTING MINERALS AND FOSSIL FUELS FROM UNDERWATER SOURCES

(75) Inventors: Vladimer Loladze, Tbilisi (GE); George Loladze, Tbilisi (GE); Nino Loladze, Tbilisi (GE); Vakhtang Loladze, Schwenksville, PA (US)

(73) Assignees: Vladimer Loladze, Tbilisi (GE); George Loladze, Tbilisi (GE); Nino Loladze, Tbilisi (GE); Vakhiang Loladze, Schwenksville, PA (US)

( * ) Notice: Subject to any disclaimer, the term of this patent is extended or adjusted under 35 U.S.C. 154(b) by 0 days.

(21) Appl. No.: 14/240,951

(22) PCT Filed: Sep. 1, 2012

(86) PCT No.: PCT/GE2012/000001
§ 371 (c)(1),
(2), (4) Date: Feb. 25, 2014

(87) PCT Pub. No.: WO2013/030605
PCT Pub. Date: Mar. 7, 2013

(65) Prior Publication Data
US 2014/0219769 A1 Aug. 7, 2014

(30) Foreign Application Priority Data
Sep. 1, 2011 (GE) ................... 2011 12361

(51) Int. Cl.
*B65G 49/00* (2006.01)
*B65D 88/78* (2006.01)
*E21B 43/01* (2006.01)
*B63B 38/00* (2006.01)
*B65D 88/22* (2006.01)
*B65D 90/00* (2006.01)

(52) U.S. Cl.
CPC ................ *B65G 49/00* (2013.01); *B65D 88/78* (2013.01); *E21B 43/01* (2013.01); *B63B 38/00* (2013.01); *B65D 88/22* (2013.01); *B65D 90/0033* (2013.01); *B63B 2702/12* (2013.01)
USPC ........................................................ 405/210

(58) Field of Classification Search
USPC ........................ 405/195.1, 210, 224; 114/257
See application file for complete search history.

(56) References Cited

U.S. PATENT DOCUMENTS 2,383,840 A * 8/1945 Benckert .......................... 222/95
3,408,971 A * 11/1968 Mott .............................. 114/257
(Continued)

OTHER PUBLICATIONS

International Search Report dated Jun. 11, 2013 for application PCT/GE2012/000001.

*Primary Examiner* — Tara M. Pinnock
(74) *Attorney, Agent, or Firm* — NKK Patent Law, PLLC

(57) ABSTRACT

The above invention pertains to the mining industry and can be applied for exploratory or industrial mining of oil, gas or gas hydrate from underwater sources and their transporting to or below the water surface.

The purpose of the invention is to transport underwater mined oil, gas or gas hydrate to or below the water surface without using pipeline systems. The proposed transporting method utilizes submergable containers which gain positive buoyancy while being filled with the extracted materials.

The proposed transporting method allows delivering mined materials continuously to the point of unloading, which can be located at or below the water surface.

The proposed invention has an advantage of transporting simultaneously different types of extracted materials such as liquid, gaseous or solid to a water surface.

4 Claims, 3 Drawing Sheets

(56) References Cited

U.S. PATENT DOCUMENTS

| | | | |
|---|---|---|---|
| 3,643,447 A * | 2/1972 | Pogonowski | 405/210 |
| 3,717,001 A * | 2/1973 | Tam | 405/210 |
| 3,837,310 A * | 9/1974 | Toyama | 114/257 |
| 4,365,576 A | 12/1982 | Cook | |
| 2008/0210434 A1 | 9/2008 | Edwards | |

* cited by examiner

METHOD FOR TRANSPORTING MINERALS AND FOSSIL FUELS FROM UNDERWATER SOURCES

CROSS REFERENCE TO RELATED APPLICATIONS

This application is a CFR section 371 national phase application of International Patent Application No. PCT/GE2012/000001 filed on Sep. 1, 2012, which claims the benefit of Georgia Patent Application number AP 2011 12361, filed Sep. 1, 2011, the contents of each of which are hereby incorporated by reference in their entirety.

The above invention pertains to the mining industry, specifically to transporting minerals, fossil fuels and other materials mined from underwater sources. The existing methods of transporting fossil fuels (e.g. natural gas and oil) utilize expensive pipeline systems (ref 1-3). An accident on this pipeline system would be devastating for the environment. Thus these systems require significant investments for environmental protection activities (ref 4). The proposed new method of transporting resources to the surface is simpler and more economical as it requires fewer resources. Furthermore, this method provides fossil fuels that are ready to be shipped. The environmental protection costs associated with this proposed method are significantly lower due to the simplicity of this system. Additional environmental safe guards included in this proposal are the compartmentalization of the delivered fossil fuels and more effective, rapid ways of controlling and preventing system accidents.

The above invention simplifies mining from underwater resources of fossil fuels and minerals, reduces material and time requirements for mining, and offers increased environmental protection.

The proposed method of transporting encompasses transporting of mined resources including oil, natural gas, and gas hydrate, metallic and non-metallic materials from underwater sources. The method includes transporting of materials from the point of extraction and/or from the point of filling to a water surface or to platforms or stations which are on the water surfaces or submerged at a certain depth. The method proposes the underwater filling of mined resource into containers which can be brought to the surface and further transported. The process of container transport is based on its buoyancy. Utilization of ballasts, liquid or solid, help to lower containers to the point of filling along guiding rails (e.g. cables or chains). After lowering to the filling site containers gain positive buoyancy while being filled with the extracted materials. Containers can be filled fully or partially. During the filling of containers ballasts are displaced, which is making them buoyant enough to rise to the surface. In the case of containers partially filled with oil, gas, gas hydrate or a gas obtained from a gas hydrate, the containers can be additionally filled with metallic and nonmetallic minerals, and then transported to the point of unloading, which can be located at or below the water surface. At the unloading point (a docking area) the containers can be filled with ballasts, fully or partially, in preparation for the next diving (lowering into the water) or further transported.

The containers can be constructed with a flexible or rigid body, and with one or more compartments, which are separated from each other by flexible membranes, or movable and/or fixed partitions. The lower section of a container is intended for filling with ballasts and the upper section for filling with extracted materials. The partitioning membranes and/or movable or nonmovable partitions are to prevent mixing of extracted materials with ballasts and with each other (e.g. mixing of oil with water). The containers may be additionally equipped with a gas generator for obtaining gas from a gas hydrate and filling fully or partially with this gas.

The containers, which are used for transporting liquid and/or gaseous substances, have a conical shaped bottom section, in which they have an inner narrowing part (e.g. a conical shape) for guiding them to the filling nozzle(s). The guiding part is equipped with a valve for filling the container with extracted materials.

Submerging the flexible or rigid containers to where the oil, gas, gas hydrate and metallic and nonmetallic minerals is being extracted and loading these containers can be achieved by several methods including filling the ballast compartment with water, by addition of ejectable weights; by separation of a container with negative buoyancy from a system which keeps it floating at water surface or at a certain depth; or by additional external load applied to a container (e.g. mechanical force).

Containers may have one or more than one compartment. After lowering a container to the point of filling, partial or full filling of compartments with oil, and/or gas takes place. This gives the container positive buoyancy and allows it come to the surface.

Adjustment of the lifting force with the amount of transported oil or gas in a container allows additional transporting of metallic and nonmetallic minerals and thus of an entire complex of transported materials in a container from a point of extraction to the point of unloading. In the case of transporting of a gas hydrate, installation of a gas generator in a container, needed for conversion of gas hydrate into a free gas, will allow to regulate buoyancy of a container by changing the amount of gas obtained from the gas generator. Regulation of a lifting force also can be achieved by applying an external load to a container, including mechanical or other type.

An arrangement of a continuous flow of lowering, loading and lifting of containers for example from three branches of a main point of loading and consecutive switching delivery of transported materials to each branch allows the system to deliver transported materials continuously to a water surface.

The proposed system has an advantage of transporting simultaneously different types of extracted materials such as liquid, gaseous or solid to a water surface.

Per proposed method, lifting and lowering of containers can be achieved independently or be fixed by utilizing sliding rails (e.g. cables or chains) which are attached to the bottom of water sources and to platforms or stations which are on the water surfaces or submerged at a certain depth for the purpose of stabilization in the case of storms or ice formation on a water surface.

The transported containers are stabilized during lowering or lifting by utilizing ballasts located on the bottom part, which can be separated into compartments by flexible, elastic membranes and/or movable or fixed partitions. The top sections are intended for filling with extracted materials and the bottom sections are intended for filling with ballasts. The transported materials from the point of extraction to a water surface are filled in compartments which are segregated from water by membranes or partitions and do not allow extracted materials to mix with water. Furthermore, an elasticity and flexibility of membranes and partitions allow changing volume, which is filled with oil or gas, and thus compensate for a pressure difference between the inside and outside of a container while raising it.

For the purpose of above mentioned pressure compensation and also for removal of water used for submerging of a container, containers can have a closed top part and unsealed bottom part through which water can freely flow.

Raised to the water surface, containers can be unloaded on the spot or further transported to a final destination.

A device for transporting extracted materials from underwater sources to floating or stationary platforms is shown in 13 figures.

Figure 1:
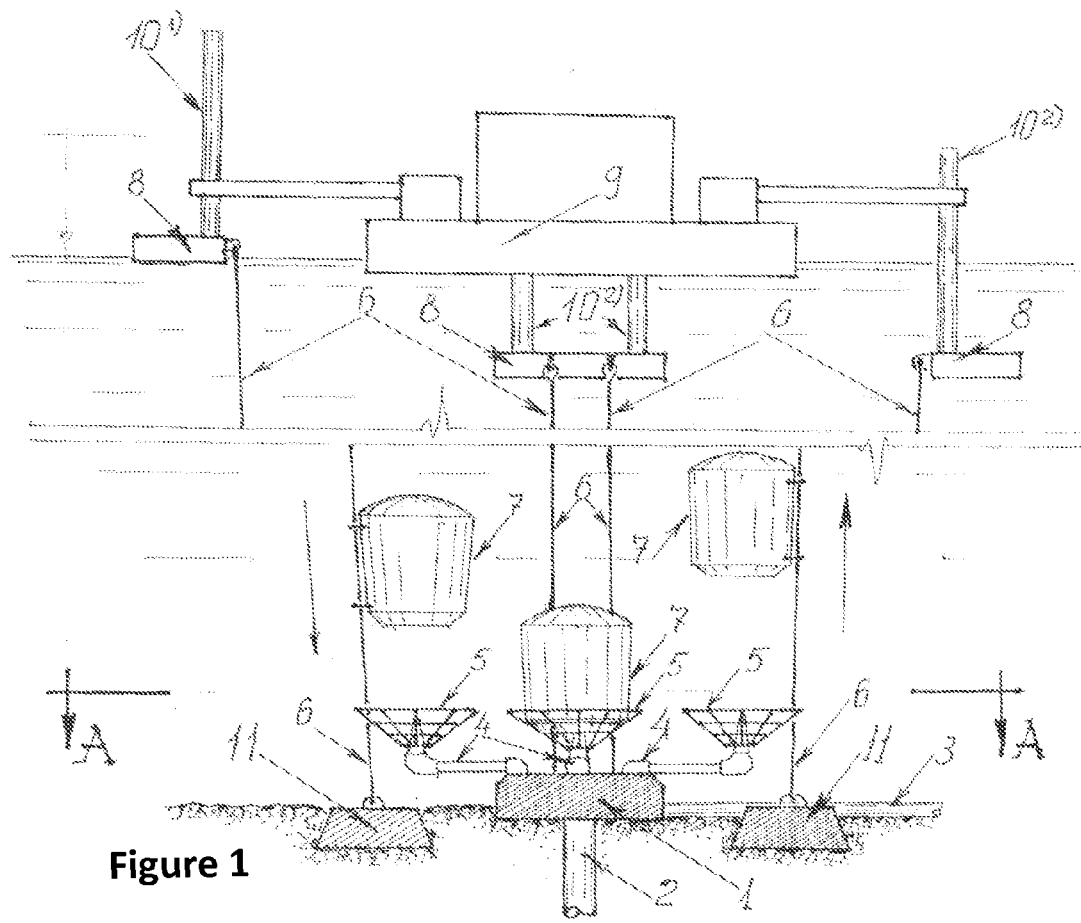
FIG. 1 shows schematics of this system and its general view from the front side. The horizontal slice A-A from FIG. 1 is shown in FIG. 2.

The components of this system are labeled and identified as follows:

1. A filling point of oil or gas at the bottom of an underwater source equipped with shut-off systems for closing delivery of oil or gas, and with delivery switching systems of oil and gas to container loading pipelines or branches.
2. A well drilled for extraction of oil or gas from an underwater source.
3. A pipeline of an underground mining system intended for transporting oil and gas (a system intended for transporting oil or gas across an underwater source bottom).
4. A branch for providing oil or gas from the point of filling—1 to containers (7).
5. Container catchers for their fixation on the ends of branches (4).
6. A cable of a fixed lowering system for transporting container from floating or stationary platform to underwater source bottom where the container filling takes place.
7. Containers for transporting oil or gas.
8. A docking area of a floating or stationary platform with anchored guiding cables (6).
9. A floating or stationary platform on the water surface.
10. A device in the form of a movable rod or frame, which allows changing position of the docking site in relation to a water surface level: $10^1$)—at the water surface level, $10^2$)—under the water surface level.
11. Anchors securing position of guiding cables on the bottom of water sources.
12. A ridged outer conical shaped lower section of a flexible container used for landing/affixing of a container to a container catcher (5) and an inner conical shaped part (15) used for guiding and affixing it to a branch (4).
13. A ridged frame for stabilizing a flexible container and limiting its movement along the guiding cables (6) between a filling site and a docking area (8).
14. Ballast (e.g. sea water) for ensuring stability and diving of an empty container during its lowering to the bottom of an underwater source.
15. Inner conical shaped part dedicated for attaching a container for filling on a branch (4).
16. Body of a container made from flexible and elastic material.
17. Skelton of a container made from flexible and elastic material intended for supporting and stabilization of its form during filling with extracted material and its transporting.
18. Inner chamber of a container intended for filling with liquid or gaseous material ready for transporting.
19. Valves for selection, pumping and bleeding of an air or gases during lowering/submerging.
20. Valve for filling of a container with transported materials, which ensures impermeability of a container during docking (7) with a tip of a branch (4) while filling.
21. Valve for a release of residual liquid material, sludge and water.
22. Valve intended for compensating pressure difference between inside and outside of a container, also intended for entry and release of seawater.
23. Body of a solid container.
24. Movable partitions with seals along contour.
25. Flexible and elastic membranes.
26. Compartment for transporting of extracted solid materials from the bottom of underwater sources to the ware surface.
27. Conveyor or hydraulic conveyor for transporting of a gas hydrate into compartment of a gas generator (29).
28. Conveyor or hydraulic conveyor for transporting of mined solid materials from bottom of the underwater sources into a compartment (26).
29. Gas generator required for converting of a gas hydrate into a free gas.
30. Robotic unit for mining of gas hydrate form at the bottom of an underwater source.
31. Gas pipeline for transferring gas from gas generator into chamber of a container (18).
32. Chamber of a container which can be filled with seawater for diving.
33. Fixed solid partition.

FIG. 1 shows an example of a system setup for the proposed method of transporting of extracted materials from the bottom of water sources to a floating or stationary platform on the water surface. The system delivers containers (7), intended for transporting of oil or gas from the point of filling (1) to a docking site (8). Furthermore, using device (10), the docking area can be located both at the water surface level ($10^{1)}$) and under the water surface level ($10^{2)}$). This ensures continuous and uninterrupted transporting of extracted material from the bottom of underwater sources regardless of weather or season conditions. Such an example will be delivery to a docking area positioned below the storm waves or below ice under freezing conditions.

Accuracy of movement of containers (7) from a docking area (8) to the point of filling (1) and landing of containers on a branch nozzle (4) is ensured by attachment of containers (7) to guiding cables or chains (6). One of the examples would be a guiding cable which is attached between docking area (8) and anchor (11) on the bottom of an underwater source and passing through an eyelet or ring on a container.

Accuracy of landing and fixing of containers on nozzles of branches (4) is insured by container catchers (5) which are installed on branches (4) and by inner conical shaped part (15) located on the bottom section of containers (7) (ref. FIGS. 3-13). At the moment of landing of a container on a nozzle of a branch (4), the nozzle enters a valve (20) which is located at the end of an inner conical shaped part (15) (ref. FIGS. 3-13) and through which filling of container with extracted material takes place.

After a container is filled with material(s) such as oil and gas, the container acquires positive buoyancy and rises to the surface along the guiding cables (6) to a docking area (8).

Figure 2:
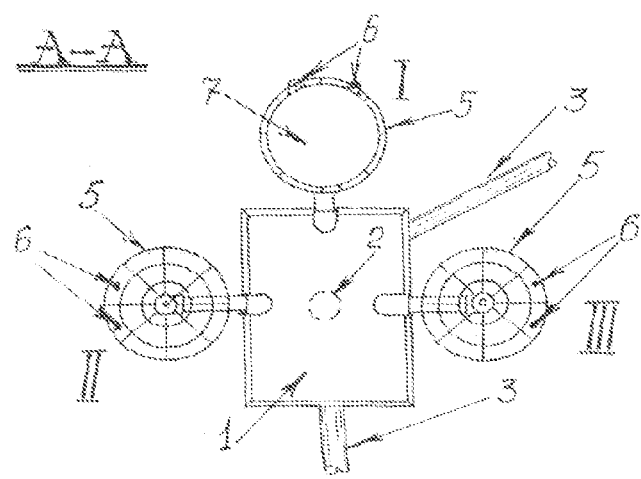

FIG. 1 shows an example of a continuous transporting of extracted materials from the bottom using three branched (4) arrangement of a main filling point (1). Each branch is operating per "filling-unloading" cycle of delivery of loaded containers which is repeated after each landing of a container on a nozzle. In this case, filling turn of containers with extracted materials through nozzles can alternate clockwise or counterclockwise. For example, steps for supplying materials to nozzles I, II and III (ref. FIG. 1 and FIG. 2) would be the following:

Step-1
   Nozzle-1: Filling (container is located on the nozzle)
   Nozzle-2: Landing and fitting (container dives and attaches to the nozzle)
   Nozzle-3: Container is released (filling of material is finished, container rises)

Step-2
   Nozzle-1: Container is released
   Nozzle-2: Filling
   Nozzle-3: Landing and fitting Step-3
   Nozzle-1: Landing and fitting
   Nozzle-2: Container is released
   Nozzle-3: Filling The next cycle will start again with the step-1 and operation of the system will continue following the "filling-unloading" cycles for continuous operation.

The above described system has an extra operational reserve built in, in case one or two of the nozzles requires maintenance or repair. The system will continue transporting extracted material while other (one or two) nozzles are being serviced or repaired. Furthermore, the cycles, timing and time required for filling can be adjusted accordingly depending on number of operational nozzles.

Figure 3:
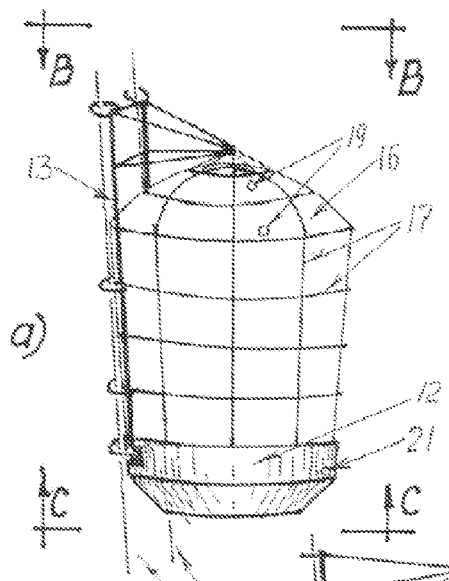
FIG. 3 shows schematics of a container with a single compartment and constructed from a flexible and elastic material.
Figure 4:
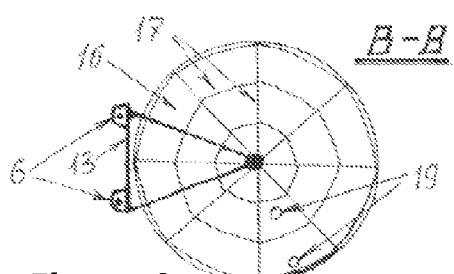
FIG. 4 shows the horizontal cross section B-B from FIG. 3.
Figure 5:
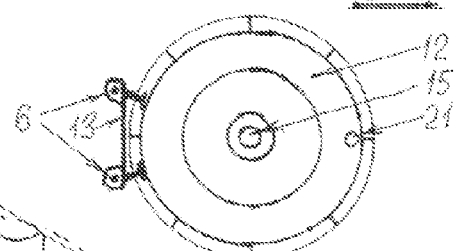
FIG. 5 illustrates the cross section C-C from FIG. 3.

FIG. 3 illustrates schematics of a single compartment container with a flexible and elastic body. Transporting of oil or gas from bottom of a water source to the water surface using this container can be achieved according to method shown in FIG. 1. The flexible and elastic container bottom section consists of two main parts: a rigid outer conical shaped bottom part (12) (ref. FIG. 3 cross section C-C and FIG. 5) for docking on container catcher (5) (ref FIGS. 1 and 2) and an inner conical shaped part (15) (ref FIGS. 6, 7 and 8), for docking on a branch (4).

A flexible and elastic container body (16) is equipped with a rigid frame (13) which is attached to a rigid bottom section (12), and a skeleton (17) (ref. FIG. 3), which provide stabilization effect during loading (filling of a container with extracted materials) of the container. Additionally, the frame (13) confines the transfer of a container along the guiding cables (6).

Figure 6:
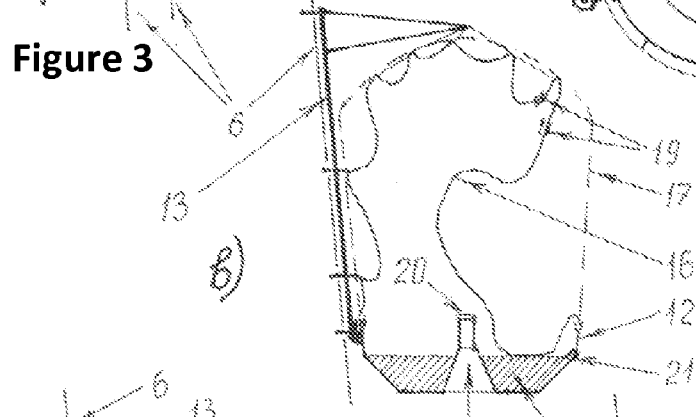
FIG. 6 shows a vertical cross section of a flexible, single compartment unfilled container.
Figure 7:
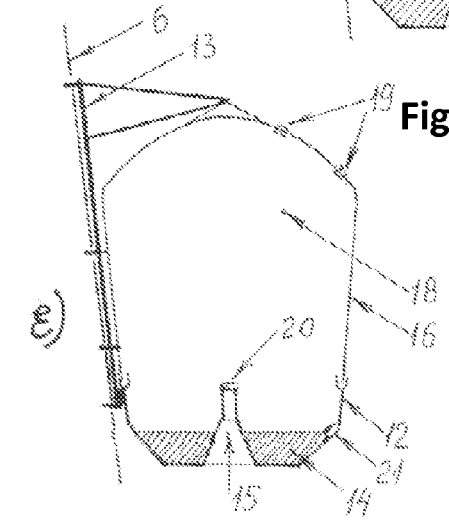
FIG. 7 illustrates a vertical cross section of a flexible, single compartment container filled with a gas.
Figure 8:
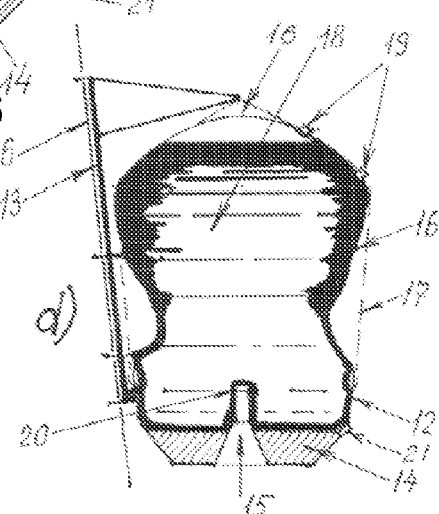
FIG. 8 shows a vertical cross section of a single compartment container filled with oil.

Cross sections of a flexible container are shown in FIGS. 6, 7 and 8. FIG. 6 shows container in an empty (unfilled) state. FIG. 7 shows filled container and FIG. 8 shows container which is filled with oil. The rigid lower part of a container is equipped with compartments filled with ballasts (14) which ensure stability and diving of an empty container.

In the case of a partially filled or empty flexible container, the container is pressed out under external influence of water (ref. FIGS. 6 and 8) until equilibrium is reached between inner and outer pressure (that is the flexibility and elasticity of a container body assists in pressure compensation depending on a diving depth/underwater depth). For example in the case of gas transporting, under partial filling conditions at the bottom of a underwater source, container pressure is compensated by flexibility of a container body which is being adjusted depending on a change in gas volume while filled or raised.

In the case of a partially filled flexible container with oil, container body flexibility compensates for increase in volume, "inflating" of the flexible body arising from separation of a gas carried along with the oil or "boiling" of liquid fractions of oil occurring from lowering of a pressure on extracted oil.

The body of a flexible container is also equipped with valves (19 and 21) (ref. FIGS. 3-8) for pumping out transported materials, release of accumulated gases, release of residual liquids, sludge and water from a container.

Figures 9, 10, 11:
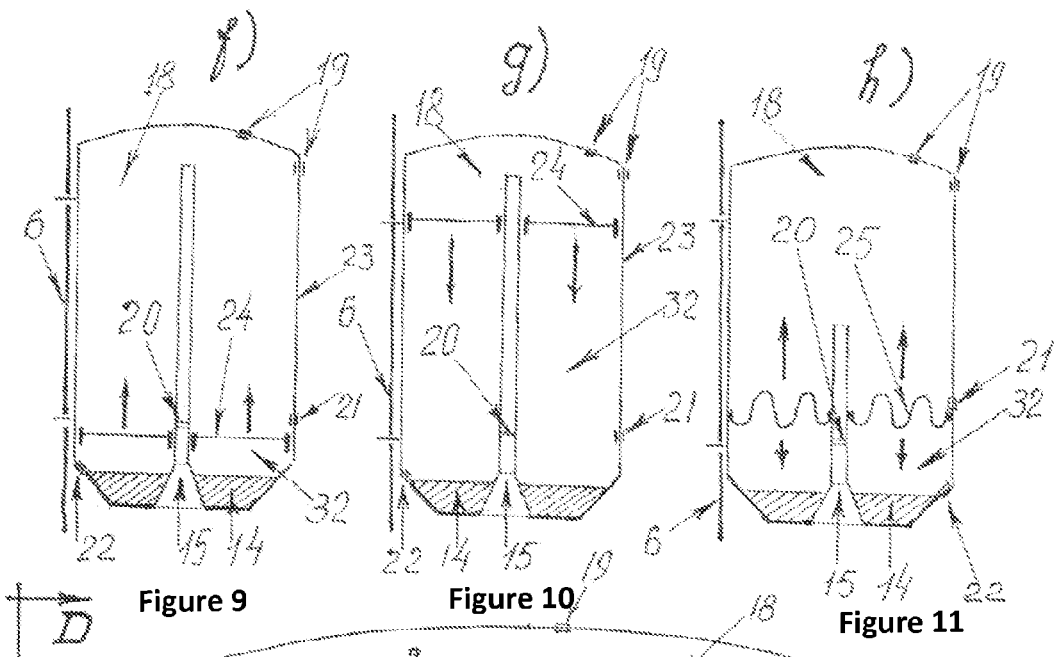
FIG. 9 illustrates a vertical cross section of a two compartmental container with movable partitions.
FIG. 10 shows container from FIG. 9 filled with gas.
FIG. 11 illustrates a vertical cross section of a two compartmental container with flexible and elastic membranes.

Cross sections of rigid containers are shown in FIGS. 9-13. FIGS. 9 and 10 show containers with movable partitions and FIG. 11 shows a container with a flexible and elastic membrane. All the shown containers in FIGS. 9-13 can be used for transporting oil or gas from the bottom of an underwater source according to schematics shown in FIG. 1.

The rigid containers are equipped with the same structural elements (12, 14 and 15) in the lower sections as the flexible containers (ref. FIGS. 9-13). Filling process of rigid containers is same as for flexible containers shown in FIGS. 3-8.

Bodies of rigid containers (23) shown in FIGS. 9-13 are divided into chambers and compartments (18, 26 and 32) using movable (24) and fixed (33) partitions, and flexible and elastic membranes (25).

Diving of rigid containers is accomplished by filling the chamber-32 with amounts of needed seawater through the valve-22. Furthermore, in containers shown in FIG. 9, the movable partition-24 moves upward (in the figure direction of movement is indicated by the arrow) and in FIGS. 11-12 the flexible elastic membrane-25 bends upward (shown by arrow direction). Excess air in the chamber-18 is release through the valve-19.

Filling of the container chamber-18 takes place at the point of filling (1) at the bottom of underwater source, through the valve-20 and excess air is released through the valve-19.

In case of transporting only gaseous materials by rigid containers it is recommended to have a transported gas in the chamber-18 without the presence of air in order to avoid formation of a combustible mixture. This can be achieved on the initial use of a rigid container during the first diving for filling.

During filling of the chamber-18, the movable partitions-24 are lowered towards the bottom of a container, the flexible membrane-25 is curved downward (shown by arrows). The water from chamber-32 in the container is released through the valve-22. During filling of a rigid container with oil or gas it acquires positive buoyancy and rises towards the docking area (8) along the guiding cables (6). Similarly to flexible containers the rigid containers are also equipped with the set of valves (19, 20, 21 and 22) for the same purpose.

Figure 12:
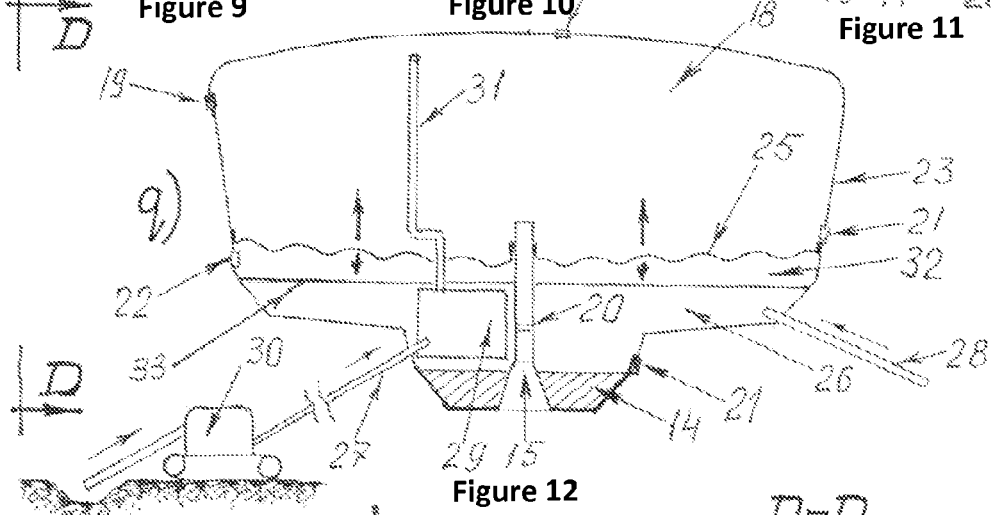
FIG. 12 shows a vertical cross section of a two compartmental rigid body container schematics intended for transporting of a gas hydrate from underwater sources.
Figure 13:
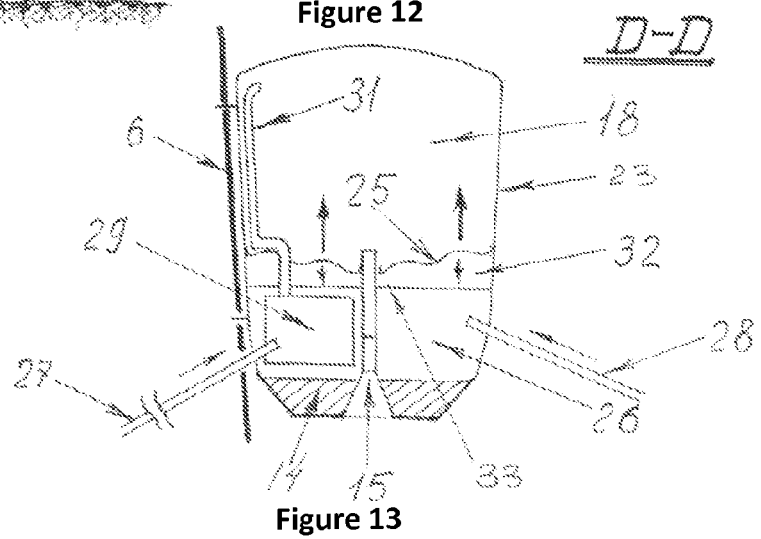
FIG. 13 shows the vertical cross section D-D from FIG. 12.

FIG. 12 shows schematics of a rigid container used for transporting of gas hydrate from the bottom of an underwater source. Per proposed scheme, the rigid container can be used not only for gas generated from gas hydrate but also for simultaneous transport of gas hydrate in the solid form and any additional solid materials extracted from the bottom and conveyed into the chamber-26 by the conveyor or hydraulic conveyor-28. Unloading of transported solid materials from chamber-26 could be achieved using the same conveyor or hydraulic conveyor-28 or any other method or device.

Gas from gas hydrate may be generated using a generator (29). The generator transforms gas hydrate into "free" gas. The gas hydrate is mined using a robotic unit (30) or any other method, and it is delivered to the generator-29 by conveyor or hydraulic conveyor (27).

The rigid container shown in FIG. 12 also can be utilized by following the schematic options shown in FIGS. 9-11 for transporting, from the bottom of an underwater source to surface, of only oil and gas (without any other extracted solid materials) which are transported by pipelines across the bottom or mined.

LITERATURE

1. ВСН 51-9-86 Проектирование морских подводных нефтепроводов ; "Design of subsea oil pipelines"
2. СНиП III-42-80* (2000) Магистральные трубопровод : "Transcontinental pipelines"
3. Патент На изобретение RU 2026963 C1 Устройство для добычи газа "Device for mining of gas"; Авторы: Черней Э.И, Писаренко В.Г., Марков А. Е., Хершберг Б.Л. Черней О.Э.
4. ГОСТ 17.1.3.10-83 Охрана природы Гидросфера Общие требования к охране поверхности и подземных вод от природы загрязнения нефтью и нефтепродуктами при транспортировании по трубопроводу "Nature conservation. Hydrosphere. General requirements for protection of surface and underground waters from oil and oil-product spills during their transporting through pipelines."

The invention claimed is:

1. A method of transporting mined resources from underwater sources, the method comprising:
    transporting underground resources, wherein the natural resources comprise one or more of oil, natural gas, gas hydrate, or metallic and non-metallic materials produced offshore, from a point of production thereof to a point of loading thereof, or installing loading facilities in the point of production of the underground resources;
    loading and/or filling one or more lower elastic or rigid membrane compartments of a transporting means for the underground resource with a solid or liquid ballast on the water surface, wherein the transporting means is constructed of a flexible or a rigid body;
    submersing the transporting means to the point of loading for the underground resource by moving the transporting means along a guiding rail;
    filling one or more upper elastic membrane or rigid compartments of the transporting means with one or combination of the oil, gas, gas-hydrate, or gas obtained from gas-hydrate partially and additionally with the metallic or non-metallic materials, wherein the transporting means further comprises a gas generator for obtaining gas from the gas-hydrate and filling the submersed transporting means with the obtained gas partially or completely, such that the ballast is displaced during loading and positive buoyancy is imparted to the transporting means for lifting to the surface; and
    lifting the transporting means to a discharging point for the underground resource.

2. The method of claim 1, wherein the transporting means has an outer lower section having a rigid conical shape for landing/affixing the transportation means to a catcher, and wherein the transporting means has an inner conical shaped part for guiding and affixing the transporting means to the loading point and comprising a valve for loading the underground resource into the transporting means.

3. The method of claim 1, further comprising applying additional external force to the transporting means for one or both of submersing the transporting means to the loading point and regulating the buoyancy of the transporting means.

4. The method of claim 1, wherein the loading point comprises more than one branch such that the transporting means can be filled at the point of loading and lifted to the discharging point by using the more than one branch to ensure continuous transporting of the underground resource to the discharging point.

* * * * *